United States Patent [19]

Itoh et al.

[11] Patent Number: 4,729,834

[45] Date of Patent: Mar. 8, 1988

[54] METHOD FOR ADSORBING AND DESORBING

[75] Inventors: Hiroshi Itoh, Yokohama; Toshimi Nakagawa, Fujisawa; Atsuhiko Nitta, Yokohama; Tomio Tanaka, Tokyo; Hideo Kamio, Odawara; Katsutoshi Nagai, Yonezawa, all of Japan

[73] Assignee: Mitsui Toatsu Chemicals, Inc., Tokyo, Japan

[21] Appl. No.: 878,647

[22] Filed: Jun. 26, 1986

Related U.S. Application Data

[63] Continuation-in-part of Ser. No. 728,211, Apr. 29, 1985, abandoned, and Ser. No. 728,027, Apr. 29, 1985, abandoned.

[30] Foreign Application Priority Data

May 7, 1984 [JP] Japan ............................... 59-89386
May 7, 1984 [JP] Japan ............................... 59-89315
May 28, 1984 [JP] Japan ............................... 59-106466

[51] Int. Cl.$^4$ ............................................. B01D 15/00
[52] U.S. Cl. ......................................... 210/670; 210/692
[58] Field of Search ............................... 210/670, 692

[56] References Cited

U.S. PATENT DOCUMENTS 3,531,463  9/1970  Gustafson ........................... 210/692
3,716,481  2/1973  Battaerd ............................. 210/673
4,124,528 11/1978  Modell ................................ 210/694

Primary Examiner—Ivars Cintins
Attorney, Agent, or Firm—Oblon, Fisher, Spivak, McClelland & Maier

[57] ABSTRACT

Disclosed herein is a high molecular composite material, which comprises as one component thereof a water insolubilized homopolymer of at least one monomer selected from specific N-alkyl- or N-alkylene-substituted (meth)acrylamides, a second copolymer of said at least one monomer with one or more monomers other than the (meth)acrylamides and copolymerizable therewith, or a water-insolubilized product of the homopolymer or either first or second copolymer. The water-insoluble product can form, with a low or high molecular compound containing one or more active hydrogen or hydrophobic groups, a composite material which may be applied widely for absorbing and desorbing a variety of valuable synthetic compounds and natural matter.

20 Claims, No Drawings

METHOD FOR ADSORBING AND DESORBING

This application is a continuation-in-part of application Ser. No. 728,211, filed Apr. 29, 1985 and Ser. No. 728,027, filed Apr. 29, 1985, both now abandoned.

BACKGROUND OF THE INVENTION

1. Field of the Invention

This invention relates to a method for adsorbing and desorbing water soluble organic compounds, and more specifically to an application method of the adsorbability of which increases when heated but decreases upon cooling.

2. Description of the Prior Art

Activated carbon has been used extensively for the recovery of valuable materials such as water soluble organic compounds, or the removal of impurities or pollutants from solutions such as aqueous solutions and for other purposes. Adsorbents making use of a non-ionic styrene-divinylbenzene copolymer as their base materials have been developed in recent years. Many attempts are now under way with a view toward using them in a wide variety of fields. Since their base materials, i.e., the styrene-divinylbenzene copolymer contains an aromatic ring having extremely strong hydrophobicity, the elution of materials adsorbed on the adsorbents is effected using an acidic or alkaline solution as an eluent or eluting them with various organic polar solvents. However, such elution methods develop various problems when eluting materials susceptible to alteration in quality or nature by heat, acids, bases, organic solvents or the like, such as physiologically-active substances including antibiotics, vitamins, enzymes, proteins, steroids and the like. Even if the adsorption and elution are effected at different temperatures, it is necessary to employ such a method as effecting the adsorption at a low temperature and the desorption at a higher temperature because the adsorbability decreases when heated. Furthermore, no substantial difference in adsorbability occurs even when the temperature is changed. It is accordingly indispensable to make the elution conditions for the above elution methods severer in order to carry out the adsorption and separation with good efficiency. Thus, contamination of eluates with eluents is unavoidable. When removing contaminants or impurities from a valuable material on the other hand, it is difficult to selectively remove such unnecessary materials only from the valuable material with the result that a significant loss of the valuable material is caused since the base material contains aromatic rings of extremely high hydrophobicity and under the circumstances its hydrophobicity cannot be fully controlled. In the case of substances having water solubility but relatively-high hydrophobicity such as proteins or antibiotics, non-specific and irreversible adsorption may take place on the adsorbent. This remains as one problem causing contamination of the adsorbent.

It has recently been disclosed to use a polymer of an N-substituted acrylamide derivative as a base material for ion-exchange resin in Japanese Patent Laid-open Nos. 105,758/1981 and 96,615/1983 as well as "Biopolymers", 22, 839-847 (1983). The ion-exchange resin has been known to have such a property that it may be used even for aqueous solutions containing electrolytes at high concentrations or for various organic solvents.

On the other hand, there have been known for many years compounds having temperature-dependent hydrophobicity, in other words, cloud points when converted into organic polymers. Some attempts have already been made to utilize their temperature-dependent hydrophobicity for adsorption and separation. For example, Japanese Patent Laid-open No. 121,804/1980 contains one Example in which the adsorption of polyethyleneglycol nonylphenyl ether having a polymerization degree of 10 was conducted using an adsorbent composed of alumina and polyvinyl methyl ether carried thereon. It has recently been uncovered that the above-described phenomenon may also take place with an aqueous solution of a polymer of N-isopropylacrylamide. For example, it is disclosed on page 117-126 of the Abstracts of Research Papers Read at the 1983 Meeting of Research Institute for Polymers and Textiles, Agency of Industrial Science and Technology, Japanese Government that making use of the above-described property of the aqueous solution of the N-isopropylacrylamide polymer, the adsorption of polyethyleneglycol nonylphenyl ether having a polymerization degree of 10 was carried out using an adsorbent composed of cotton fabric and N-isopropylacrylamide graftpolymerized thereon. In each of the above disclosures, properties of the base material, i.e., the N-isopropylacrylamide polymer as an adsorbent do not appear to have been fully clarified, because the polyethyleneglycol nonylphenyl ether used as the solute contains by itself nonylphenyl groups, which are hydrophoic groups, and polyethyleneglycol groups which become hydrophobic upon heating. According to a study conducted by the present inventors, they do not seem to be satisfactory as adsorbents as demonstrated by Comparative Examples which will be given herein.

With a primary objective placing on the separation of proteins, water-soluble high-molecular compounds, and like substances, another development has also been made on a separation method in which the hydrophobicity of hydrophobic groups such as phenyl groups or alkyl groups are utilized by introducing such hydrophobic groups into polysaccarides such as agarose.

Although the above separation method does not develop such non-specific irreversible adsorption as mentioned above, upon elution of once-adsorbed protein, contamination of the eluate with an electrolyte, acid, base or the like is unavoidable. In addition, such a polysaccharide gel generally has low mechanical strength. When a solution is passeed through the polysaccharide gel in order to conduct the adsorption and emoval of contaminants, impurities or the like from the solution actually, the polysaccharide gel tends to develop such problems as pressure loss, clogging and the like. Therefore, it is not a fully satisfactory adsorbent.

SUMMARY OF THE INVENTION

An object of this invention is to provide a method for adsorbing and desorbing a water soluble organic compounds capable of minimizing contamination by an eluent such as acid, base or electrolyte when eluting an adsorbed material, applied such an adsorption and desorption function that the adsorption and desorption take place at higher temperatures and lower temperatures respectively, and enjoying sufficient adsorbability.

The above object of this invention can be fulfilled by water-insolubilizing a homopolymer of one N-alkyl- or N-alkylene-substituted (meth)acrylamides, a copolymer of two or more of the N-alkyl- or N-alkylene-substituted (meth)acrylamides or a copolymer of one or more of the N-alkyl- or N-alkylene-substituted (meth)acrylamides and one or more other copolymerizable monomers (which homopolymer or copolymer is rendered hydrophobic when heated).

A method for adsorbing and disorbing a water soluble organic compounds of the present invention may be used for the adsorption and separation of various physiologically-active substances and various organic compounds from solutions containing the same, for the decolorization and purification of solutions containing various compounds, for the adsorption treatment of various waste liquids, etc.

This invention provides a method for absorbing and desorbing water soluble organic compounds containing active hydrogen selected from the group consisting of one or more hydroxyl groups substituted to the aromatic ring or the aliphatic hydrocarbon radical or of a carboxyl group substituted to the aromatic hydrocarbon radical or the aliphatic hydrocarbon radical, or containing a hyrophobic group selected from the group consisting of surfactants, proteins, physiologically-active substances or colorants.

DETAILED DESCRIPTION OF THE PREFERRED EMBODIMENTS

The term "(meth)acrylamides" as used herein means acrylamides and methacrylamides, whereas the term "homopolymer or copolymer of these (meth)acrylamides" are polymers, each, of at least one monomer represented by the following general formula:

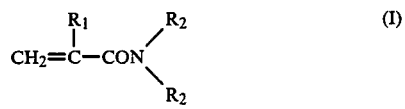

wherein $R_1$ means a hydrogen atom or methyl group and $R_2$ denotes a methyl or ethyl group, or

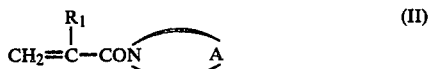

wherein $R_1$ means a hydrogen atom or methyl group and A denotes $-(CH_2)_n-$ (n: 4–6) or $-(CH_2)-O-(CH_2)_2-$, a first copolymer of two or more monomers selected from the (meth)acrylamides, a second copolymer of at least one monomer selected from the (meth)acrylamides and one or more monomers other than the (meth)acrylamides and copolymerizable with the (meth)acrylamides.

As exemplary monomers represented by the general formula (I) or (II), may be mentioned N-acryloylpyrrolidine; N-methacryloylpyrrolidine; N-acryloylpiperidine; N-methacryloylpiperidine; N-acryloylhexahydroazepine; N-methacryloylhexahydroazepine; N-acryloylmorpholine; N-methacryloylmorpholine; N,N-dimethylacrylamide; N,N-dimethylmethacrylamide; N,N-diethylacrylamide; and N,N-diethylmethacrylamide.

On the other hand, illustrative of monomers copolymerizable with the above-described monomers may be hydrophilic monomers, ionic monomers and hydrophobic monomers. One or more of such monomers may be used.

More specifically as hydrophilic monomers, (meth)acrylamide and their lower alkyl-substituted, hydroxyl-substituted and polyalkyleneglycol-substituted derivatives may be mentioned. In addition, it may also be possible to use monomers imparted with hydrophilicity by hydrolysis of polymers.

Their representative examples are: acrylamide; methacrylamide; N-methylacrylamide; N-ethylacrylamide; N-n-propylacrylamide; N-n-propylmethacrylamide; N-isopropylacrylamide; N-isopropylmethacrylamide; diacetoneacrylamide; hydroxyethyl methacrylate; hydroxyethyl acrylate; hydroxypropyl methacrylate; hydroxypropyl acrylate; various methoxypolyethyleneglycol methacrylates; various methoxypolyethyleneglycol acrylates; N-vinyl-2-pyrrolidone; vinylphenol; isopropenylphenol; and the like.

Furthermore, hydrophilicity may also be imparted by introducing vinyl acetate, glycidyl methacrylate or the like through copolymerization and then subjecting the resultant copolymers to hydrolysis.

As ionic monomers, may be mentioned carboxylsubstituted monomers, sulfo-substituted monomers, dialkylamino-substituted monomers and so on. In addition, may also be mentioned those imparted with ionic properties by the hydrolysis of polymers. Typical ionic monomers are for example: acids such as acrylic acid, methacrylic acid, vinylsulfonic acid, allylsulfonic acid, methallylsulfonic acid, styrenesulfonic acid, 2-acrylamido-2-phenylpropanesulfonic acid, and 2-acrylamido-2-methylpropanesulfonic acid, and theirs salts; as well as amines such as N,N-dimethylaminoethyl methacrylate, N-N-diethylaminoethyl methacrylate, N,N-dimethylaminoethyl acrylate, N,N-dimethylaminopropylmethacrylamide and N,N-dimethylaminopropylacrylamide, and their salts.

Ionic properties may also be imparted by introducing various acrylates methacrylates, acrylamides, methacrylamides, acrylonitriles and the like through copolymerization and then subjecting the resultant copolymers to hydrolysis.

As hydrophobic monomers, may be mentioned alkyl-substituted, glycidyl-substituted and glycidoxy-alkyl-substituted derivatives of (meth)acrylamide, (meth)acrylate derivatives, nitrile-substituted monomers, esterified monomers, aromatic ringsubstituted monomers, etc. Their representative examples are: N-alkyl(meth)acrylamide derivatives such as N-ethylmethacrylamide, N,N-di-n-propylacrylamide, N-n-butylacrylamide, N-n-butylmethacrylamide, N-tertbutylacrylamide, N-tertbutylmethacrylamide, N-n-hexylacrylamide, N-n-hexylmethacrylamide, N-n-octylacryl-amide, N-n-octylmethacrylamide, N-tert-octylacrylamide, N-n-dodecylacrylamide, N-n-dodecylmethacrylamide and the like; N-(ω-glycidoxyalkyl)(meth)acrylamide derivatives such as N,N-diglycidylacrylamide, N,N-diglycidylmethacrylamide, N-(5-glycidoxypentyl)acryl-amide, N-(6-glycidoxyhexyl)acrylamide, etc.; (meth)acrylate derivatives such as ethyl acrylate, methyl methacrylate, butyl methacrylate, lauryl acrylate, 2-ethylhexyl methacrylate, glycidyl methacrylate and so on; acrylonitrile; vinyl acetate; vinyl chloride; styrene; α-methylstyrene; butadiene; isoprene; and the like.

As a method for water-insolubilizing polymers of the above-mentioned monomers, they may be insolubilized upon their polymerization or by treating them subsequent to their polymerization. As specific insolubilization methods, may be mentioned to copolymerize the above-described (meth)acrylamide derivatives with a crosslinkable monomer containing two or more double bonds per molecule wherein the term "the (meth)acrylamide derivatives" means the (meth)acrylamides as described in the formula (I) or (II) or a combination thereof with the above-described copolymerizable monomers and will be used in the description about the insolubilization methods hereinafter; to copolymerize the (meth)acryl-amide derivatives with N-alkoxymethyl(meth)acrylamide derivatives; to copolymerize the (meth)acrylamide derivatives with a hydrophobic monomer in large proportions relative to the (meth)acrylamide derivatives; to polymerize without a solvent the (meth)acryl-amides derivatives; to subject the polymers to heat treatments; to integrate the polymers with a water-insoluble fibrous material such as cellulose or the like; and when hydroxyl groups, amino groups or the like are contained in polymers, to react such groups with a polyfunctional compound such as epichlorohydrin so as to crosslink and insolubilize the polymers; as well as to copolymerize the polymers with a monomer containing a substituent group, which contains active hydrogen such as carboxyl group, sulfonic acid (or sulfo) group, hydroxyl group or the like, substituted thereto or to cause the polymers to form composite materials with a polymer containing such substituent groups substituted thereto.

More specifically, the first method can employ as the crosslinkable monomers, N,N'-methylenebisacrylamide, N,N-diallylacrylamide, triacrylformal, N,N-diacryloylimide, N,N-dimethacryloylimide, ethyleneglycol acrylate, ethyleneglycol dimethacrylate, various polyethylene glycol diacrylate, various polyethyleneglycol dimethacrylates, propyleneglycol diacrylate, propyleneglycol dimethacrylate, various polypropyleneglycol diacrylates, various polypropyleneglycol dimethacrylates, 1,3-butyleneglycol diacrylate, 1,3-butyleneglycol dimethacrylate, 1,4-butyleneglycol dimethacrylate, glycerol dimethacrylate, neopentylglycol dimethacrylate, trimethylolpropane triacrylate, trimethylolpropane trimethacrylate, trimethylolethane trimethacrylate, trimethylolethane triacrylate, tetramethyloylmethane tetramethacrylate, tetramethylolmethane triacrylate, divinyl benzene, diallylphthalate, etc. As the N-alkoxymethyl(meth)acrylamide derivatives in the second method, including an N-hydroxymethyl(meth)acrylamide derivative may be employed, for example, N-methylol(meth)acrylamide, N-methoxymethyl(meth)acrylamide, N-ethoxymethyl(meth)acrylamide, N-n-butoxymethyl(meth)acrylamide, N-tert-butoxymethyl(meth)acrylamide or the like. In the third method, the proportion of the hydrophobic monomer to the (meth)acrylamide derivative having amphiphilic properties may vary depending on the combination of the (meth)acrylamide derivative and hydrophobic monomer and cannot thus be sweepingly determined to any specific proportion. However, its proportion may generally be at least 1% or preferably 3% or more. As a technique for effecting the bulk polymerization in the fourth method, it may be feasible to employ such a technique as polymerizing a monomer without diluting it with a solvent so as to obtain a polymer block or effecting polymerization in droplets of the monomer while suspending the monomer in a solvent so that the resultant polymer is obtained in a granular or particulate form. In the fifth method in which each polymer is subjected to a heat treatment, the heating conditions vary depending on the polymer. However, a polymer obtained by bulk polymerization, suspension polymerization, solution polymerization or the like may generally be subjected to a heat treatment at 60° 250° C. or preferably 80°-200° C. In the case of a polymer obtained by solution polymerization, the heat treatment may be conducted concurrently with the drying of the polymer or the removal of solvent from the polymer. As the sixth method in which the polymer is integrated with a fibrous material or the like, it may be possible to employ such a method as impregnating a water-insoluble fibrous material such as fibers of cellulose, nylon, polyester or acrylic polymer, non-woven fabric made of polypropylene, ethylene-propylene copolymer or the like or a water-insoluble porous inorganic material such as silica, alumina or zeolite with the above-described (meth)acrylamide derivative, followed by polymerization of the (meth)acrylamide derivative there, graft-polymerizing the (meth)acrylamide derivative to such fibers, non-woven fabric or porous inorganic materials, or impregnating such fibers or non-woven fabric or porous inorganic materials with a homopolymer or copolymer of the (meth)acrylamide derivative. In the seventh method in which a polyfunctional compound such as epichlorohydrin is reacted to crosslink and insolubilize the homopolymer or copolymer, it is necessary to introduce hydroxyl or amino groups in the homopolymer or copolymer in advance. Amino groups can be readily introduced by copolymerization. In the case of hydroxyl groups, they may be introduced by copolymerizing the (meth)acrylamide derivative with hydroxyethyl methacrylate, isopropenylphenol or the like or by copolymerizing the (meth)acrylamide derivative with vinyl acetate, glycidyl methacrylate or the like and then saponifying the resultant copolymer with a basic substance. Thereafter, the resultant polymer is reacted with a polyfunctional compound such as epichlorohydrin in the presence of a basic substance to crosslink and insolubilize the polymer. Upon conducting the reaction, the polymer is turned like agar-agar when it is insolubilized as is, namely, in the aqueous form. By crushing the thus-insolubilized product, it becomes ready for actual applications. On the other hand, the polymer can be obtained in the form of a granular or particulate gel when its aqueous solution is dispersed in an oil and is then insolubilized.

In the eighth method, the insolubilization, namely, the formation of the composite material is effected by copolymerizing the (meth)acrylamide derivative with the above-described monomer containing active hydrogen, mixing the polymer of the derivative with a polymer of the monomer, or substituting active hydrogen atoms in a polymer of such a monomer with ammonium ions or the like, and then adding an acid to the resultant mixture to restore active hydrogen for the formation of the composite material.

The above-described eight methods may be employed either singly or in combination. Better results may generally be obtained when two or more of the above methods are used in combination.

As more specific polymerization methods useful upon preparation of the homopolymer or copolymer of this invention in accordance with the above-described methods, it is possible to employ such a method as (1) polymerizing the monomer as is without diluting same with any solvent so as to prepare a polymer block, (2) polymerizing the monomer in a solvent, and drying the resultant polymer after its polymerization or causing the polymer to deposit in a poor solvent so as to obtain the polymer, (3) obtaining as a granular or particulate polymer by suspension polymerization, (4) obtaining as a polymer latex by emulsion polymerization, or (5) impregnating or graftpolymerizing a solution of the polymer to an waterinsoluble fibrous material or porous inorganic material so as to integrate the polymer with the fibrous or inorganic material. As a method for initiating the polymerization, better results may generally be obtained from the use of a polymerization initiator although the polymerization may still be initiated by simply heating the monomer. No limitation is imposed on the polymerization initiator so long as it can initiate radical polymerization. Illustrative of the polymerization initiator may be inorganic peroxides, organic peroxides, combinations of such peroxides and reducing agents, and azo compounds. Specifically, there are potassium persulfate, hydrogen peroxide, tert-butyl peroxide, benzoyl peroxide, tert-butyl peroxy-2-ethyl hexanoate, butyl perbenzoate, etc. As reducing agents to be combined with such polymerization initiators, may be mentioned sulfites, hydrogen-sulfites, low-valence metal salts such as iron, copper and cobalt salts, organic amines such as aniline, and reducing sugars such as aldose and ketose. It may be feasible to use, as azo compounds, azobisisobutyronitrile, 2,2'-azobis-2-amidinopropane hydrochloride, 2,2'-azobis-2,4-dimethylvaleronitrile, 4,4'-azobis-4-cyanovaleic acid and the like. Two or more of the above-described polymerization initiators may be used in combination. It is sufficient if such a polymerization initiator is added within an amount range usually employed, for example, within the range of 0.01–5 wt. % or preferably 0.05–2 wt. % based on the monomer or monomers.

Of polymers obtained in the above manner, those obtained in block forms or available after removal of solvents by distillation may be crushed into powder or molten and formed into granules or beads, flakes, fibers or films. Particulate or granular polymers may be provided as they are. On the other, latex-like polymers may be impregnated or coated to fibrous materials such as fabric or paper or may be formed into films. They can then be provided as adsorbents.

The insolubilized homopolymer and copolymer of this invention (hereinafter referred to as adsorbents) may be prepared in various forms by the methods described above. Their suitable forms are automatically determined depending on how they will be used.

The separation and purification of the water soluble organic compounds as valuable materials or substances and the removal of impurities from valuable materials or substances may be mentioned as one of principal utility of the adsorbents of this invention. Such separation, purification and removal are generally carried out by column chromatography. Adsorbents packed in such columns are conveniently of powdery or granular forms, including from those employed for analytical liquid chromatography to those used for chromatography as industrial separation means. Powdery products may be obtained by various methods, for example, by conducting gel polymerization in an aqueous solution and then drying and crushing the resultant gel as described above. On the other hand, granular products may generally be produced with ease by suspension polymerization. Since N,N-alkyl- or N-alkylene substituted acrylamides or methacrylamides which are used in the present invention are generally highly-soluble in water, suspension polymerization may be effected using the reversed-phase suspension polymerization technique in which a monomer, its aqueous solution or the like is dispersed in an oil, the salting-out suspension polymerization in which the polymerization is conducted under such conditions that a large amount of an electrolyte or the like is dissolved in an aqueous solution to suppress the solubility of a monomer, or the deposition and suspension polymerization technique in which polymerization is effected at a high temperature above the cloud point of the resulting polymer so as to deposit the resulting polymer. It is also possible to use adsorbents obtained by integrating such polymers with inorganic porous particles, granules or beads such as silica, alumina or zeolite, for example, by impregnating or graft-polymerizing solutions of the polymers to the surfaces of such inorganic porous particles, granules or beads. Porous polymers may also be prepared if a third component miscible with the monomers but immiscible with the resulting polymers is added upon polymerization of the monomers.

As compounds which may be adsorbed and desorbed by the above-described adsorbents, a very wide variety of compounds may be mentioned. Among such compounds, preferred ones may be classified into two groups, namely, (1) compounds containing active hydrogen and (2) compounds containing hydrophobic groups. The adsorbents of this invention may be applied to such compounds whether they are low molecular compounds or high molecular compounds.

Compounds containing active hydrogen are those substituted by one or more hydroxyl or carboxyl groups. Among such compounds, preferred ones are compounds substituted especially by substituent groups containing active hydrogen bonded to oxygen atom, for example, hydroxyl or carboxyl groups. Hydroxyl-substituted compounds may be divided roughly into low molecular compounds and high molecular compounds. Low molecular compounds may be classified into phenols and alcohols. Phenols are compounds each of which contains one or more hydroxyl groups substituted to the aromatic ring, including for example phenol, cresol, xylenol, hydroquinone, benzenetriol, salicyl alcohol, naphthol, anthrol, nonylphenol, carvacrol, vinylphenol, isopropenylphenol, diphenylphenol, biphenyldiol, naphthylphenol, phenylnaphthol, p-cumylphenol, 4,4'-dihydroxydiphenyl-2,2-propane, 4,4'-dihydroxydiphenylsulfon, etc. Also included are those containing halogen atom or atoms and/or nitro, amino, thiol and/or alkoxy groups substituted to aromatic rings in addition to alkyl or alkenyl groups. As alcohols, there are those individually containing one or more hydroxyl groups substituted to an aliphatic or alicyclic hydrocarbon group or to the side chain of an aromatic hydrocarbon group, polyalkylene glycols containing at least one of the two hydroxyl groups remaining as is, and those containing hydroxyl groups substituted to heterocyclic groups. As compounds each containing one or more hydroxyl groups substituted to a saturated aliphatic or alicyclic hydrocarbon group, may for example be mentioned methanol, ethanol, butanol, hexanol, octanol, decanol, lauryl alcohol, stearyl alcohol, ethylene glycol, propylene glycol, butanediol, glycerol, pentaerythritol, pinacol, cyclohexanol, cyclohexanediol, menthol, benzyl alcohol, phenethyl alcohol, etc. Then, as polyalkylene glycols containing at least one of the two hydroxyl groups remaining as is, may for example be included polyalkylene glycols such as diethylene glycol, dipropylene glycol, triethylene glycol, tripropylene glycol and the like, those obtained by substituting one of the hydroxyl groups of the above substituted by phenoxy groups such as polyethylene glycol nonylphenyl ether.

Carboxyl-substituted compounds may be roughly divided into low molecular compounds and high molecular compounds. The low molecular compounds include those substituted to aliphatic hydrocarbon radicals, those substituted alicyclic or aromatic hydrocarbon radicals, and those substituted to heterocyclic groups. As those obtained by substituting one or more carboxyl groups to an aliphatic hydrocarbon radical, may for example be mentioned formic acid, acetic acid, propionic acid, butyric acid, valeric acid, pivalic acid, lauric acid, myristic acid, palmitic acid, stearic acid, oxalic acid, malonic acid, succinic acid, glutaric acid, adipic acid, pimelic acid, suberic acid, azelaic acid, sebacic acid, butanetricarboxylic acid, hexanetricarboxylic acid, acrylic acid, propiolic acid, methacrylic acid, crotonic acid, oleic acid, maleic acid, fumaric acid, citraconic acid and so on. Illustrative of those obtained by substituting one or more carboxyl groups to an alicyclic or aromatic hydrocarbon radical may be cyclohexanecarboxylic acid, camphoric acid, benzoic acid, phthalic acid, isophthalic acid, terephthalic acid, naphthoic acid, toluic acid, biphenylcarboxylic acid, benzenetricarboxylic acid, pyromellitic acid, naphthalenetricarboxylic acid, phenylacetic acid, phenylpropionic acid, cinnamic acid, naphthalenetriacetic acid, naphthalnehexanoic acid. etc. Also included are those obtained by substituting halogen atoms, nitro group, amino group, thiol group, alkoxy groups and the like to aromatic rings. Needless to say, are also included amino acids obtained by substituting amino groups to the above compounds. As such amino acids, may for example be mentioned alanine, $\beta$-alanine, phenylalanine, arginine, cystine, glycine, histidine, serine, isoleucine, lysine, methionine, cysteine, tryptophan, asparatic acid, glutamic acid, norvaline, norleucine, ornithine, proline, sarcosine, threonine, thyronine, tyrosine, valine and so on.

Exemplary high molecular compounds may include homopolymers and copolymers of unsaturated carboxylic acids such as acrylic acid, propiolic acid, methacrylic acid, maleic acid, fumaric acid and the like as well as copolymers between such unsaturated carboxylic acids and other copolymerizable monomers. Also included are those obtained by hydrolyzing homopolymers or copolymers of various acrylates, methacrylates, acrylamides, methacrylamides, acrylonitriles, maleic anhydrides and the like so as to put back carboxylic groups thereto. As the above-mentioned other copolymerizable monomers, may be mentioned the above-described hydrophobic monomers and ionic monomers. Further, (meth)acrylamide and its N-substituted derivatives may also be used.

In addition, those obtained by introducing both hydroxyl and carboxyl groups to each molecule are also included. As such compounds, may for example be mentioned glycolic acid, lactic acid, $\beta$-hydroxypropionic acid, glyceric acid, tartronic acid, malic acid, tartaric acid, tropic acid, benzilic acid, salicylic acid, vanillic acid, protocatechuic acid, gallic acid, etc.

In compounds containing hydrophobic groups, there are those containing, as their hydrophobic groups, cyclic structures such as aromatic rings and long-chain hydrocarbon radicals. More specifically, may be mentioned surfactants, proteins, physiologically-active substances such as antibiotics, colorants and perfumes. They are generally hydrophobic by themselves but still have solubility in water.

As surfactants are included all anionic, nonionic, cationic and amphoteric surfactants. As anionic surfactants, may be mentioned fatty acid soaps, N-acylamino acids and their salts, salts of alkylethercarboxylic acids, acylated peptides, salts of alkylbenzenesulfonic acids, salts of alkylnaphthalenesulfonic acids, salts of dialkylsulfosuccinic acid esters, salts of $\alpha$-olefinsulfonic acids, N-acylmethyltaurine, sulfonated oils, higher alcohol sulfates, alkyl ether sulfates, polyoxyethylenealkyl phenyl ether sulfates, phosphoric acid esters, etc. Illustrative of non-ionic surfactants may be alkyl and alkylaryl polyoxyethylene ether, alkylarylformaldehyde condensed polyoxyethylene ether, block polymers containing polyoxypropylene groups as hydrophobic groups, polyoxy-ethylene ethers of glycerin esters, polyoxyethylene ethers of sorbitan esters, polyoxyethylene ethers of sorbitol esters, polyethylene glycol fatty acid esters, glycerin esters, sorbitan esters, propylene glycol esters, sucrose esters, fatty acid alkanol amides, polyoxyethylene fatty acid amides, polyoxyethylene alkylamines, alkylamine oxides, etc. As cationic surfactants, may for example be mentioned aliphatic amine salts, and their quaternary ammonium salts, heterocyclic quaternary ammonium salts, etc. As amphoteric surfactants, may for example be mentioned carboxybetaine type surfactants, aminocarboxylic acid type surfactants, imidazolinium betaine and the like.

As proteins, those soluble in water are preferred. A very wide range of proteins may be employed. Since proteins are polypeptides having molecular weights in the range of from 1,000 to 1,000,000, their types are extremely diversified and cannot all be exemplified. Their representative examples are only given below: sucrose, glucagon, cytochrome C, myoglobin, chymotrypsinogen, egg white albumin, ovomucoid, malic acid dehydrogenase, bovine serum albumin, transferrin, E. coli phosphatase, lactoperoxidase, fetuin, glyceraldehyde-3-phosphoric acid dehydrogenase, lactic acid dehydrogenase, serum albumin, aldolase, yeast alcohol dehydrogenase, ceruloplasmin, fumarase, catalase, $\gamma$-globulin, R-phycoerythrin, $\alpha$-conarakin, fibrinogen, apoferritin, urease, $\beta$-galactosidase, ferritin, $\alpha$-crytallin, etc.

As physiologically-active substances such as antibiotics, may be mentioned antibiotics followed by hypnosedatives, antiepileptics, antipyretic, analgesic and antiphlogistic drugs, mental and nervous drugs, obtundents, muscle relaxants, autonomic drugs, sense organ drugs, antihistamines, cardiotonics, antiarrhythmics, hypotensor and diuretic drugs, vasodilators, therapeutic drugs for arteriosclerosis, anhelation drugs, antibechic and expectorant drugs, digestive organ drugs, adrenal hormone preparations, sex hormone preparations, and other hormone preparations, bacteriocidal and disinfectant agents, vitamin preparations, nourishing, antasthenic and alterative agents, anticoagulants, stiptics, liver drugs, therapeutic drugs for intoxication, enzyme preparations, antidiabetics, antimalignant tumor drugs, chemotherapeutic drugs, biological preparations, anthelmintics, antiprotozoals, narcotics, etc. Each of them includes a number of compounds of different types. Even taking antibiotics by way of example, they may be classified into penicillin-type antibiotics, cephalosporin C-type antibiotics, macroride-type antibiotics, chloramphenicol-type antibiotics, tetracycline-type antibiotics, etc.

As colorants, may be mentioned those obtained by introducing chromogenic groups into the above-described aromatic compounds. They may be roughly classified into dyes, organic pigments, coloring agents, various titration indicators and the like. Exemplary dyes may include cationic dyes, basic dyes, acid dyes, disperse dyes, substantive dyes, sulfur dyes, vat dyes, azoic dyes, fluorescent brightening dyes, composite dyes, and the like. As organic pigments, may be mentioned soluble azo pigments, insoluble azo pigments (naphthol type), insoluble azo pigments (anilide type), phthalocyanin type pigments, color lakes, mordant type pigments (alizarin type), vat pigments etc. As coloring agents, may be mentioned synthetic tar colors and their aluminum lakes as well as natural colors, all of which are principally employed as food colors. They are for example red food colors, yellow food colors, green food colors, blue food colors, $\beta$-carotene, iron chlorophyllin sodium, copper chlorophyll and so on.

As various titration indicators, may be mentioned neutralization titration indicators such as Methyl Red and phenolphthalein, chelate titration indicators such as ureo chromium black and cresol-phthalein complexon, redox titration indicators such as Methylene Blue and diphenylamine-4-sulfonic acid, adsorption indicators such as fluorescein and dichlorofluorescein, etc.

Perfumes contain aromatic rings or long-chain alkyl groups as their skeletal structures, to each of which are substituted one or more of acyl, alkoxy, formyl, alkyl, alkenyl, alkoxyacyl, amino, hydroxyl, lactam, hydroxyalkyl, hydroxyalkenyl, formylalkyl, formylalkenyl, carboxyalkyl, carboxyalkenyl, alkoxycarbonylalkyl, alkoxycarbonylalkenyl and alkoxycarbonyl groups and the like.

As specific methods for adsorbing and desorbing of the above-described compounds by using the above-described adsorbent of this invention, it is possible to employ the batch method in which the adsorbent is added to aqueous solutions of the above compounds to adsorb the compounds on the adsorbent, the fixed bed method in which the adsorbent is packed in columns or the like and the aqueous solutions are caused to flow therethrough, and the fluidized bed method in which the adsorbent is caused to flow through the aqueous solutions. Since the mechanical strength of the adsorbent is high, it is possible to cause the aqueous solutions to flow at high flow velocities in each of the above methods. When adsorbing the above compounds on the adsorbent, it is better to conduct the adsorption at relatively high temperatures. It is however essential to control the adsorption temperatures at levels at which the adsorbate compounds do not undergo quality alteration or lower. The adsorbability does not always increase as the temperature rises. In some instances, there are optimum temperatures. Therefore, the adsorption temperature cannot be defined sweepingly. It may generally be within the range of 10°-100° C. It is however convenient to effect actual adsorption after the optimum temperature has been obtained by effecting an adsorption test in advance. Turning next to the pH of each aqueous solution upon conducting its adsorption, the adsorbent of this invention can be used in both acid and alkaline ranges so long as the adsorption is effected under usual conditions because the adsorbent of this invention contains an N,N-disubstituted (meth)acrylamide polymer as its base material. In the case of compounds substituted by substituent groups having an active hydrogen such as one or more carboxyl groups, sulfonic acid groups, hydroxyl groups, phosphoric groups and/or the like, the adsorbability may generally be increased if their adsorption is effected in a neutral to acidic range. In the case of amphoteric substances such as amino acids, the adsorbability may be increased if their adsorption is effected at pH levels below their isoelectric points. The amount of each adsorbate adsorbed in the above manner may vary depending on the polymer type, the structure of the adsorbent such as the existence or non-existence of macropores, the type of the adsorbate compound, the adsorption method, etc. However, it is approximately 1–1,000 mg/g-adsorbent. The adsorbability may be increased by forming macropores in the adsorbent.

If an adsorbate compound cannot be dissolved in water or the like, it is possible to use a solvent such as methanol, ethanol, isopropanol, acetone, dioxane, dichloroethane, benzene, toluene, hexane or the like or its mixed solvent with water.

Turning next to the desorbing temperature, the adsorbate can be desorbed more efficiently and the adsorbent can thus be recovered with better efficiency as the temperature goes down. The desorbing temperature is within the range of $-10°-+50°$ C. As an alternative method, it is possible to effect the desorption in an alkaline state in the case of the above-described compounds substituted by substituent groups containing active hydrogen or at pHs of isoelectric points or higher in the case of amphoteric substances or in combination of above-described methods. After desorption, a new adsorbate solution may be caused to pass through columns to undergo adsorption again. Otherwise, after desorption, the adsorbent regeneration can be carried out by causing chilled water or an alkaline solution through columns to wash throughly the adsorbent.

The suitable polymer composition varies depending on each compound to be adsorbed and desorbed. It is thus preferred to carry out an adsorption test in advance for each adsorbate compound so that a suitable polymer composition can be selected. However, it is practically impossible to conduct such a test on every combination. As general tendency, relatively good results may in many instances be obtained if an adsorbent having relatively low hydrophobicity is used upon adsorbing and desorbing highly-hydrophobic compounds and if an adsorbent having relatively high hydrophobicity is employed upon adsorbing and desorbing compounds having low hydrophobicity.

As a method for judging the hydrophobicity of the adsorbent of this invention, it is possible to utilize the property of the adsorbent that it is rendered hydrophobic when heated. Namely, when polymer components of this invention are formed into aqueous solution without their insolubilization, many of them are rendered hydrophobic and exhibit cloud points when heated. Based on the cloud points, it is possible to judge the hydrophobicity of the polymers. Generally speaking, the hydrophobicity becomes more remarkable as the cloud point decreases and the hydrophilicity increases as the cloud point becomes higher. Examples of measurement of cloud points of polymer components of this invention in their aqueous solutions will be given herein as Referential Examples.

Namely, a polymer having a lower cloud point has higher hydrophobicity. Therefore, it can adsorb more adsorbate. There is thus a problem on the desorbability of the adsorbate at low temperatures. Where the cloud point of a polymer is high on the other hand, its hydrophobicity is low and it can generally adsorb less adsorbate. However, the desorbability of the adsorbate is better.

As mentioned above, the adsorbability varies depending on the composition of each polymer. Although, the adsorbability may be controlled, for example, by changing the surface structure of each adsorbent into a porous structure.

When effecting desorption at a low temperature, it is ideal if the adsorbate can be desorbed in its entirety. However, the desorption cannot be completely achieved in some instances as the desorption is somewhat related to the adsorbability.

The composition of each polymer may thus be chosen depending on whether the importance is placed on adsorption or on desorption.

Although it has not been elucidated to date why the N,N-disubstituted (meth)acrylamide polymers in the adsorbents of this invention show better adsorbability than N-mono-substituted (meth)acrylamide polymers, they show the following differences when converted into aqueous solutions. When N,N-diethylacrylamide and N-n-butylacrylamide having the same molecular formula are compared with each other, the former is formed into a water-soluble polymer having a cloud point of 35° C. while the latter is turned to a water-insoluble polymer. The cloud point of the former compound is substantially comparable with the cloud point, i.e., 33° C. of a N-isopropylacrylamide polymer as an N-monosubstituted (meth)acrylamide. Even among N,N-disubstituted (meth)acrylamides, the cloud point increases further to 51° C. in the case of N-acryloylpyrrolidine, in which the substituent groups form a ring via an amido group. As mentioned above, the difference in properties shown in aqueous solutions between the N-mono-substituted compound and the N,N-disubstituted compound appears to give some influence on their adsorption properties of the polymers although they have exactly the same constituent elements.

The method for adsorbing and desorbing water soluble organic compounds of this invention has the following advantageous effects:

(1) Since it can adsorb upon heating and desorb upon cooling as has been described above, adsorption and desorption can be effected while maintaining the pH and composition such as electrolyte in each solution as they are. It is hence possible to minimize contamination by an acid, base, electrolyte and/or the like and at the same time to separate a valuable material or substance in a purer state.

(2) Since it makes use of a polymer of an N-alkyl-or N-alkylene-substituted (meth)acrylamide as a base material, it is an adsorbent having excellent mechanical strength so that it may be used over a wide pH range, at a high electrolyte concentration, and even in organic solvents, to say nothing of water.

The method for adsorbing and desorbing water soluble organic compounds according to this invention has an extremely wide range of specific utility, including for example adsorption and separation of vitamins, antibodies, enzymes, steroid antibiotics and other physiologically-active substances from fermentation liquors, decolorization of a variety of aqueous saccharide solutions, separation of aliphatic and aromatic carboxylic acids, decolorization of various saccharified starch liquors, packing materials for gas chromatography and liquid chromatography, removal of phenols, separation of various surface-activating materials, adsorption and separation of various perfumes, decolorization of pulp mill waste water, decolorization and purification of various chemical substances such as drugs, agricultural chemicals and the like.

The present invention will hereinafter be described in further detail by the following Examples.

EXAMPLE 1

After adiabatically polymerizing a 30% aqueous solution of N-acryloylpyrrolidine (N-AcPy) which contained 0.5 wt. % of N,N'-methylenebisacrylamide (MBS), the resultant gel was chopped into small pieces and then dried. Thereafter, the thus-dried gel was crushed and a 20-100 mesh fraction was collected as a sample. To 50 ml of an aqueous solution containing 310 ppm of phenol, 1.0 g of the sample powder was added. After stirring the mixture for 15 minutes at a predetermined temperature, it was allowed to stand for 5 minutes. By measuring the absorbance of its supernatant at 254 nm, the amount of adsorbed phenol was calculated. The adsorbed amount per gram of the sample powder was measured at various temperatures, resulting in 1.30 mg at 0.5° C., 2.00 mg at 25° C., 2.25 mg at 40° C., 3.50 mg at 60° C. and 4.10 mg at 80° C. When the temperature was lowered again to 0.5° C. thereafter, it was 1.35 mg.

EXAMPLES 2-5

With the copolymer compositions given in Table 1, sample powders were obtained by conducting polymerization and crushing in the same manner as in Example 1. Following the procedure of Example 1, the amount of adsorbed phenol per gram of each sample powder was measured. Results are shown in Table 1. The sample powders were microscopically observed both before and after the measurement. The microscopic observation did not find any sample fracture developed by the repetition of heating and cooling or the stirring.

TABLE 1

| Ex. | Composition of copolymer (wt. %) | Amount of adsorbed phenol per gram of sample (mg) | | | | | |
|---|---|---|---|---|---|---|---|
| | | 0.5 | 25° C. | 40° C. | 60° C. | 80° C. | 0.5° C. |
| 2 | N—AcPy/MBA (98.0) (2.0) | 1.20 | 1.75 | 2.06 | 3.36 | 3.81 | 1.30 |
| 3 | N—AcPy/N—AcPi/MBA (23.5) (24.5) (2.0) | 1.00 | 2.00 | 3.29 | 4.79 | 4.94 | 1.25 |
| 4 | N—AcPy/N—AcPi/MBA (49.0) (49.0) (2.0) | 1.10 | 4.10 | 6.45 | 6.80 | 6.30 | 1.35 |
| 5 | N—AcPy/N—AcPi/MBA (24.5) (73.5) (2.0) | 0.35 | 7.20 | 8.00 | 7.40 | 6.65 | 0.85 |

N—AcPi — N—acryloylipiperidine

EXAMPLES 6-9

Using the same sample powders of Examples 2-5 and an aqueous solution which contained 296 ppm of benzoic acid, the amounts of adsorbed benzoic acid per gram of the respective sample powders were measured in the same manner as in Example 1. Results are given in Table 2.

EXAMPLES 10–13

Using the same sample powders of Examples 2–5 and an aqueous solution which contained 318 ppm of decaethyleneglycol mono(p-nonylphenyl) ether (NP-10), the amounts of adsorbed NP-10 per gram of the respective sample powders were measured in the same manner as in Example 1. Results are given in Table 3.

EXAMPLES 17 and 18

Using the same sample powders as those used in Examples 4 and 5 and an aqueous solution which contained 319 ppm of chloramphenicol, the amounts of adsorbed chloramphenicol per gram of the respective sample powders were measured in the same manner as in Example 1. Results are given in Table 4.

COMPARATIVE EXAMPLE 1

With a 30% aqueous solution of N-isopropylacryla-

TABLE 2

| Ex. | Composition of copolymer (wt. %) | Amount of adsorbed benzoic acid per gram of sample (mg) | | | | | |
|---|---|---|---|---|---|---|---|
| | | 0.5 | 25° C. | 40° C. | 60° C. | 80° C. | 0.5° C. |
| 6 | N—AcPy/MBA (98.0) (2.0) | 1.00 | 1.65 | 2.20 | 3.45 | 3.95 | 1.20 |
| 7 | N—AcPy/N—AcPi/MBA (73.5) (24.5) (2.0) | 1.10 | 2.40 | 4.10 | 5.30 | 5.20 | 1.40 |
| 8 | N—AcPy/N—AcPi/MBA (49.0) (49.0) (2.0) | 1.20 | 5.12 | 7.03 | 7.28 | 6.42 | 1.41 |
| 9 | N—AcPy/N—AcPi/MBA (24.5) (73.5) (2.0) | 0.65 | 8.54 | 9.19 | 8.49 | 7.39 | 1.05 |

TABLE 3

| Ex. | Composition of copolymer (wt. %) | Amount of adsorbed NP-10 per gram of sample (mg) | | | | | |
|---|---|---|---|---|---|---|---|
| | | 0.5 | 25° C. | 40° C. | 60° C. | 80° C. | 0.5° C. |
| 10 | N—AcPy/MBA (98.0) (2.0) | 0.05 | 0.15 | 1.10 | 3.90 | 9.10 | 0.07 |
| 11 | N—AcPy/N—AcPi/MBA (73.5) (24.5) (2.0) | 0.10 | 1.05 | 3.30 | 9.75 | 9.70 | 0.13 |
| 12 | N—AcPy/N—AcPi/MBA (49.0) (49.0) (2.0) | 0.12 | 1.90 | 10.61 | 11.41 | 11.36 | 0.16 |
| 13 | N—AcPy/N—AcPi/MBA (24.5) (73.5) (2.0) | 0.03 | 4.15 | 9.55 | 13.00 | 13.20 | 0.05 |

EXAMPLE 14

Using the same sample powder as that used in Example 5 and an aqueous solution which contained 464 ppm of DL-phenylalanine and had been adjusted to pH 3 with hydrochloric acid, the amount of adsorbed DL-phenylalanine per gram of the sample powder was measured in the same manner as in Example 1. Results were 0.10 mg at 0.5° C., 5.63 mg at 25° C., 8.63 mg at 40 C., 11.00 mg at 60 C. and 12.58 mg at 80 C. When the temperature was lowered again to 0.5° C. thereafter, it was 0.17 mg.

EXAMPLES 15 and 16

Using the same sample powders as those used in Examples 4 and 5 and an aqueous solution which contained 407 ppm of bovine serum albumin (BSA), the amounts of adsorbed BSA per gram of the respective sample powders were measured in the same manner as in Example 1. Results are given in Table 4.

mide which contained 1.0 wt. % of N,N'-methylenebisacrylamide, a sample powder was obtained by conducting polymerization and crushing in the same manner as in Example 1. Following the procedure of Example 17, the amount of adsorbed chloramphenicol per gram of the sample powder was measured. Results were 0.03 mg at 0.5° C., 0.14 mg at 25° C., 0.92 mg at 40° C., 1.28 mg at 60° C. and 0.95 mg at 80° C. When the temperature was lowered again to 0.5° C. thereafter, it was 0.11 mg.

EXAMPLES 19 and 20

Using the same sample powders as those used in Examples 4 and 5 and a aqueous solution which had been adjusted to pH 4 with hydrochloric acid and contained 31 ppm of Methyl Orange, the amounts of adsorbed Methyl Orange per gram of the respective sample powders were measured in the same manner as in Example 1. Results are shown in Table 4.

TABLE 4

| Ex. | Composition of copolymer (wt. %) | Amount of adsorbed phenol per gram of sample (mg) | | | | | | |
|---|---|---|---|---|---|---|---|---|
| | | 0.5° C. | 10° C. | 15° C. | 20° C. | 25° C. | 30° C. | 0.5° C. |
| 15 | N—AcPy/N—AcPi/MBS (49.0) (49.0) (2.0) | 0.09 | 1.72 | 2.31 | 2.97 | 7.00 | 7.53 | 0.22 |
| 16 | N—AcPy/N—AcPi/MBS (24.5) (73.5) (2.0) | 0.09 | 5.15 | 13.66 | 15.07 | 15.88 | 16.03 | 0.20 |
| | | 0.5° C. | 25° C. | 40° C. | 60° C. | 80° C. | 0.5° C. | |
| 17 | N—AcPy/N—AcPi/MBS (49.0) (49.0) (2.0) | 0.14 | 1.32 | 3.73 | 5.18 | 4.44 | 0.19 | |
| 18 | N—AcPy/N—AcPi/MBS (24.5) (73.5) (2.0) | 0.16 | 2.93 | 5.80 | 6.76 | 5.40 | 0.18 | |

TABLE 4-continued

| Ex. | Composition of copolymer (wt. %) | Amount of adsorbed phenol per gram of sample (mg) | | | | | |
|---|---|---|---|---|---|---|---|
| 19 | N—AcPy/N—AcPi/MBS (49.0) (49.0) (2.0) | 0.06 | 0.56 | 0.69 | 0.55 | 0.29 | 0.11 |
| 20 | N—AcPy/N—AcPi/MBS (24.5) (73.5) (2.0) | 0.05 | 0.68 | 0.80 | 0.58 | 0.38 | 0.09 |

EXAMPLE 21

A 30% solution of N,N-dimethylacrylamide, which contained 2.0 wt % of N,N'-methylenebisacrylamide, in N,N-dimethylformamide was poured in a Dewar flask. After sweeping the solution with nitrogen gas, azoisobutyronitrile was added to an amount of 1.5% at 30° C. and the contents were then subjected to adiabatic polymerization. The thus-obtained gel was chopped into small pieces and dried at 120° C. Then, it was crushed and a 20–100 mesh fraction was collected as a sample. Using the sample powder, the amount of adsorbed phenol per gram of the sample powder was measured at various temperatures in the same manner as in Example 1. It was 1.70 mg at 0.5° C., 2.15 mg at 25° C., 5.5 mg at 40° C., 6.5 mg at 60° C. and 7.0 mg at 80° C. When the temperature was lowered again to 0.5° C. thereafter, it was 1.65 mg.

EXAMPLE 22

A sample powder was obtained in exactly the same manner as in Example 1, using a 30% aqueous solution of N-acryloylmorpholine which contained 2.0 wt. % of N,N'-methylenebisacrylamide. Using the sample powder, the amount of adsorbed phenol per gram of the sample powder was measured at various temperatures in the same manner as in Example 1. It was 1.25 mg at 0.5° C., 3.5 mg at 25° C., 5.7 mg at 40° C., 7.70 mg at 60° C. and 8.50 mg at 80° C. When the temperature was lowered again to 0.5° C. thereafter, it was 1.20 mg.

REFERENTIAL EXAMPLE 1

To a 100 ml, four-necked, round bottom flask, were added with stirring and under a nitrogen gas stream 45.0 g of distilled water and 5.0 g of N-acryloylpyrrolidine, followed by further addition of 0.50 g of ammonium persulfate and 0.23 g of sodium hydrogensulfite. The contents were polymerized at 15 30° C. for 4 hours.

The resultant aqueous polymer solution was placed in a testing tube having an inner diameter of 15 mm, in which a standard thermometer was inserted. The temperature of the solution was gradually raised while stirring it with the thermometer in a temperature controlled bath. The solution started clouding at 48.5° C., and at 51° C. was clouded so much that the mercury bulb of the thermometer was no longer visible. Even when heated further beyond the above temperature, the aqueous solution remained in the stable cloudy state. When the solution was progressively cooled, it became clear at temperatures below the cloud point.

REFERENCE EXAMPLES 2–41

Polymerization was conducted in exactly the same manner as in Referential Example 1 except that the monomer combinations given in Tables 7, 8, 9 and 10 were used. However, the amounts of ammonium persulfate and sodium hydrogensulfite were each reduced to one half in Referential Examples 2, 3, 5, 16 and 20–41. Using the thus-obtained aqueous polymer solutions, their initiation temperatures of clouding and cloud points were measured in exactly the same manner as in Referential Example 1. The term "cloud points" means the temperatures at which the mercury bulb of the thermometer became no longer visible due to clouding. Results are shown in Tables 5, 6, 7 and 8. By the way, the term "initiation temperatures of clouding" means the temperatures at which their respective solutions started clouding when heated.

In each of the Referential Examples, the clouded solution became colorless and clear by its cooling.

TABLE 5

| Ref. Ex. | Unsaturated amide (g) | Copolymerized monomer (g) | Initiation temp. of clouding (°C.) | Cloud point (°C.) |
|---|---|---|---|---|
| 2 | N—acryloylpyrrolidine (1.25) | N,N—diethylacrylamide (1.25) | 42 | 43 |
| 3 | N—acryloylpyrrolidine (1.88) | ethyl acrylate (0.62) | 39 | 50 |
| 4 | N—acryloylpiperidine (5.0) | — | 6 | 10 |
| 5 | N—acryloylpyrrolidine (1.88) | N—methacryloylpyrrolidine (0.62) | 72 | 75 |
| 6 | N—acryloylpiperidine (1.75) | acrylamide (1.25) | 39 | 45 |
| 7 | N—acryloylpiperidine (2.25) | N,N—dimethylacrylamide (0.75) | 25 | 28 |
| 8 | N—acryloylpiperidine (1.50) | N,N—dimethylacrylamide (1.50) | 57 | 64 |
| 9 | N—acryloylpiperidine (2.25) | N—ethylacrylamide (0.75) | 16 | 17.5 |
| 10 | N—acryloylpiperidine (1.50) | N—ethylacrylamide (1.50) | 31 | 33 |
| 11 | N—acryloylpiperidine (0.75) | N—ethylacrylamide (2.25) | 58 | 62 |

TABLE 6

| Ref. Ex. | Unsaturated amide (g) | Copolymerized monomer (g) | Initiation temp. of clouding (°C.) | Cloud point (°C.) |
|---|---|---|---|---|
| 12 | N—acryloylpyrrolidine (2.25) | N—n-butylacrylamide (0.75) | 33 | 37 |
| 13 | N—acryloylpyrrolidine (3.75) | N—n-propylacrylamide (1.25) | 49 | 52 |
| 14 | N—acryloylpyrrolidine (2.50) | N—n-propylacrylamide (2.50) | 38 | 40 |
| 15 | N—acryloylpyrrolidine (1.25) | N—n-propylacrylamide (3.75) | 34 | 35 |
| 16 | N—acryloylpyrrolidine (2.37) | methyl methacrylate (0.13) | 40 | 54 |
| 17 | N—acryloylpyrrolidine (1.87) | N—acryloylpiperidine (0.63) | 40 | 41 |
| 18 | N—acryloylpyrrolidine (1.25) | N—acryloylpiperidine (1.25) | 23 | 24 |
| 19 | N—acryloylpyrrolidine (0.63) | N—acryloylpiperidine (1.87) | 19 | 20 |
| 20 | N—acryloylpyrrolidine (1.88) | N—methacryloylpiperidine (0.62) | 72 | 74 |
| 21 | N—acryloylpyrrolidine (2.45) | N—acryloylazacycloundecane (0.05) | 60 | 62 |

TABLE 7

| Ref. Ex. | Unsaturated amide (g) | Copolymerized monomer (g) | Initiation temp. of clouding (°C.) | Cloud point (°C.) |
|---|---|---|---|---|
| 22 | N—acryloylpiperidine (2.38) | sodium acrylate (0.12) | 2 | 2.5 |
| 23 | N—acryloylpiperidine (2.38) | APPS—Na* (0.12) | 2.5 | 3 |
| 24 | N—acryloylpiperidine (2.38) | AMPS—NA** (0.12) | 2.5 | 3 |
| 25 | N—acryloylpiperidine (1.25) | N—vinylpyrrolidone (1.25) | 3.5 | 6.5 |
| 26 | N—acryloylpyrrolidine (1.88) | N,N—dimethylmethacrylamide (0.63) | 73.5 | 76 |
| 27 | N—acryloylpiperidine (2.25) | N—acryloylhexahydroazepine (0.25) | 47.5 | 49.5 |
| 28 | N—acryloylhexahydro-azepine (1.0) | N—ethylmethacylamide (1.5) | 33 | 38 |

*APPS—Na: Sodium 2-acrylamido-2-phenylpropanesulfonate
**AMPS—Na: Sodium 2-acrylamido-2-methylpropanesulfonate

TABLE 8

| Ref. Ex. | Unsaturated amide (g) | Copolymerized monomer (g) | Initiation temp. of clouding (°C.) | Cloud point (°C.) |
|---|---|---|---|---|
| 29 | N,N—diethylacrylamide (5.00) | — | 34.5 | 34.7 |
| 30 | N,N—diethylacrylamide (1.50) | N—ethylacrylamide (1.00) | 34.5 | 36 |
| 31 | N,N—diethylacrylamide (2.25) | methyl methacrylate (0.25) | 29 | 34 |
| 32 | N,N—diethylacrylamide (2.25) | N—n-butylacrylamide (0.25) | 18 | 20 |
| 33 | N,N—diethylacrylamide (2.25) | APPS—Na* (0.25) | 40.5 | 42 |
| 34 | N,N—diethylacrylamide (1.75) | N—vinylpyrrolidone (0.75) | 30 | 32 |
| 35 | N,N—diethylacrylamide (0.63) | N—n-propylacrylamide (1.88) | 23.5 | 24.5 |
| 36 | N,N—diethylacrylamide (1.25) | N—n-propylacrylamide (1.25) | 23 | 25 |
| 37 | N,N—diethylacrylamide (1.88) | N—n-propylacrylamide (0.63) | 27.5 | 28.5 |
| 38 | N—n-propylmethacryl-amide (0.63) | N,N—diethylacrylamide (1.88) | 26.5 | 27.5 |
| 39 | N—n-propylmethacryl-amide (1.25) | N,N—diethylacrylamide (1.25) | 28.5 | 30 |
| 40 | N—n-propylmethacryl-amide (1.88) | N,N—diethylacrylamide (0.63) | 31 | 31 |
| 41 | N,N—diethylacrylamide (1.25) | N—isopropylacrylamide (1.25) | 22 | 23 |

*APPS—Na: Sodium 2-acrylamido-2-phenylpropanesulfonate

EXAMPLE 23

Dissolved in 1,170 g of distilled water were 124.95 g of N-acryloylpyrrolidine, 374.85 g of N-acryloylpiperidine and 10.0 g of N,N'-methylenebisacrylamide to obtain an aqueous solution of the mixture of N-acryloylpyrrolidine, N-acryloylpiperidine and N,N'-methylenebisacrylamide. After cooling the aqueous solution to 10° C., it was transferred to a 2-liter, Dewar flask made of stainless steel. It was bubbled with nitrogen gas for 1 hour by feeding the nitrogen gas at a flow velocity of 1 liter/min. through a ball filter. Thereafter, a solution containing 2.55 g of ammonium persulfate dissolved in 10 g of distilled water and another solution containing 1.16 g of sodium hydrogen sulfite dissolved in 10 g of distilled water were simultaneously added to the above aqueous solution and the resultant aqueous solution was adiabatically polymerized. The resultant gel was chopped into small pieces and then dried. It was thereafter crushed and a 20–100 mesh fraction was collected as a sample. Two grams of the sample powder were added to 100 ml of an aqueous solution which contained 310 ppm of phenol. After stirring the resultant mixture at 40° C. for 15 minutes, it was filtered through a glass filter to obtain 3.8 g of a swollen gel. By measuring the phenol concentration of the filtrate, it was found that the swollen gel held 16.0 mg of the phenol. Thereafter, 0.475 g of the swollen gel (the amount of held phenol: 2.0 mg) was packed in a glass column having an inner diameter of 1.0 cm and a length of 10 cm. Distilled water was caused to pass at 0.5° C. and a flow velocity of 3.5 ml/min. through the column. After fourty five minutes, the phenol concentration of the thus-passed solution reached below its detectable lower limit. The phenol concentration of the above-obtained solution was measured. It indicated that 99% of the phenol, which had been held in the swollen gel, had been released.

Incidentally, the phenol concentrations were each determined by measuring the absorbance of its corresponding solution at 254 nm.

EXAMPLE 24

By using 0.475 g of the swollen gel which had been obtained in Example 23 and contained 2.0 mg of phenol, the releasing time and released amount were measured at 40° C. in the same manner as In Example 23. After 4 hours, the phenol concentration of the thus passed solution reached below the detectable lower limit. However, the amount of the released phenol was 78% of its initially-held amount.

EXAMPLE 25–32

With the copolymer compositions given in Table 9, sample powders were obtained by effecting their polymerization and grinding in the same manner as in Example 23. By using those sample powders, swollen gels holding their corresponding substances given in Table 9 were obtained in the same manner as in Example 23. By using the swollen gels, their releasing times and released percentages were measured at various temperatures. Results are shown in Table 9.

TABLE 9

| | Swollen gel | | Held substance | | Releasing temp. (°C.) | Releasing time (hrs.) | Released percentage (%) |
|---|---|---|---|---|---|---|---|
| Ex. | Composition (wt. %) | Amount (g) | Name | Held Amount | | | |
| 25 | N—AcPy/N—AcPi/MBA (73.5) (24.5) (2.0) | 0.74 | benzoic acid | 1.3 mg | 0.5 | 0.5 | 97 |
| 26 | N—AcPy/N—AcPi/MBA (73.5) (24.5) (2.0) | 0.74 | benzoic acid | 1.3 mg | 60 | 3.5 | 82 |
| 27 | N—AcPy/MBA (98.0) (2.0) | 0.60 | decathyleneglycol mono (p-nonylphenyl) ether | 2.3 mg | 0.5 | 1.0 | 98 |
| 28 | N—AcPy—MBA (98.0) (2.0) | 0.60 | decaethyleneglycol mono (p-nonylphenyl) ether | 2.3 mg | 80 | 4.5 | 79 |
| 29 | N—AcPy/N—AcPi/MBA (49.0) (49.0) (2.0) | 0.50 | chloramphenycol | 1.3 mg | 0.5 | 1.5 | 96 |
| 30 | N—AcPy/N—AcPi/MBA (49.0) (49.0) (2.0) | 0.50 | chloramphenycol | 1.3 mg | 60 | 5.0 | 75 |
| 31 | N—AcPy/N—AcPi/MBA (49.0) (49.0) (2.0) | 0.55 | bovine serum albumin | 1.9 mg | 0.5 | 0.75 | 96 |
| 32 | N—AcPy/N—AcPi/MBA (49.0) (49.0) (2.0) | 0.55 | bovine serum albumin | 1.9 mg | 30 | 4.5 | 81 |

EXAMPLES 33 and 34

By using the sample powder obtained in Example 23, the releasing time and released percentage of the substance given in Table 10 were measured at various temperatures in the same manner as in Example 23. Results are given in Table 10.

EXAMPLE 35–36

By using the swollen gels obtained in Examples 33–34, the releasing times and released percentages of the substances shown in Table 4 were measured at various temperatures in the same manner as in Example 23 except that the pH of the passed distilled water was adjusted to pH 8 with sodium hydroxide. Results are shown in Table 10.

TABLE 10

| | Swollen gel | | Held substance | | Releasing temp. (°C.) | Releasing time (hrs.) | Released percentage (%) |
|---|---|---|---|---|---|---|---|
| Ex. | Composition (wt. %) | Amount (g) | Name | Held Amount | | | |
| 33 | N—AcPy/N—AcPi/MBA | 0.45 | Methyl Orange | 0.2 mg | 0.5 | 1.5 | 95 |

TABLE 10-continued

| Ex. | Swollen gel Composition (wt. %) | Amount (g) | Held substance Name | Held Amount | Releasing temp. (°C.) | Releasing time (hrs.) | Released percentage (%) |
|---|---|---|---|---|---|---|---|
| 34 | N—AcPy/N—AcPi/MBA (24.5) (73.5) (2.0) | 0.45 | Methyl Orange | 0.2 mg | 40 | 5.5 | 80 |
| 35 | N—AcPy/N—AcPi/MBA (24.5) (73.5) (2.0) | 0.45 | Methyl Orange | 0.2 mg | 0.5 | 1.0 | 97 |
| 36 | N—AcPy/N—AcPi/MBA (24.5) (73.5) (2.0) | 0.45 | Methyl Orange | 0.2 mg | 40 | 4.0 | 85 |

EXAMPLES 37–42

By using dry gel powders which had been obtained by drying the swollen gels, obtained in Examples 25, 27 and 29, overnight at 60° C., the releasing times and releasing percentages of the substances given in Table 11 were measured in the same manner as in Example 23. Results are shown in Table 11.

TABLE 11

| Ex. | Dry gel powder Composition (wt. %) | Amount (g) | Held substance Name | Held Amount | Releasing temp. (°C.) | Releasing time (hrs.) | Released percentage (%) |
|---|---|---|---|---|---|---|---|
| 37 | N—AcPy/N—N—AcPi/MBA (73.5) (24.5) (2.0) | 0.25 | benzoic acid | 1.4 mg | 0.5 | 0.75 | 95 |
| 38 | N—AcPy/N—AcPi/MBA (73.5) (24.5) (2.0) | 0.25 | benzoic acid | 1.4 mg | 60 | 5.0 | 79 |
| 39 | N—AcPy/MBA (98.0) (2.0) | 0.20 | decaethyleneglycol mono (p-nonylphenyl) ether | 2.1 mg | 0.5 | 1.5 | 97 |
| 40 | N—AcPy/MBA (98.0) (2.0) | 0.20 | decaethyleneglycol mono (p-nonylphenyl) ether | 2.1 mg | 80 | 6.0 | 77 |
| 41 | N—AcPy/N—AcPi/MBA (49.0) (49.0) (2.0) | 0.25 | chloramphenycol | 1.3 mg | 0.5 | 2.0 | 96 |
| 42 | N—AcPy/N—AcPi/MBA (49.0) (49.0) (2.0) | 0.25 | chloramphenycol | 1.3 mg | 60 | 6.0 | 71 |

EXAMPLES 43 and 44

By using dry gel powders which had been obtained by drying the swollen gels, obtained in Examples 33, overnight at 60° C., the releasing times and releasing percentages of the substances given in Table 12 were measured in the same manner as in Example 33. Results are shown in Table 12.

EXAMPLES 45 and 46

By using dry gel powders obtained in Examples 43, the releasing times and releasing percentages of the substances given in Table 12 were measured in the same manner as in Example 35. Results are shown in a Table 12.

TABLE 12

| Ex. | Dry gel powder Composition (wt. %) | Amount (g) | Held substance Name | Held Amount | Releasing temp. (°C.) | Releasing time (hrs.) | Released percentage (%) |
|---|---|---|---|---|---|---|---|
| 43 | N—AcPy/N—AcPi/MBA (24.5) (73.5) (2.0) | 0.25 | Methyl Orange | 0.20 mg | 0.5 | 2.0 | 94 |
| 44 | N—AcPy/N—AcPi/MBA (24.5) (73.5) (2.0) | 0.25 | Methyl Orange | 0.20 mg | 40 | 7.0 | 77 |
| 45 | N—AcPy/N—AcPi/MBA (24.5) (73.5) (2.0) | 0.25 | Methyl Orange | 0.20 mg | 0.5 | 1.5 | 94 |
| 46 | N—AcPy/N—AcPi/MBA (24.5) (73.5) (2.0) | 0.25 | Methyl Orange | 0.20 mg | 40 | 5.5 | 81 |

What is claimed as new and desired to be secured by Letters Patent of the United States is:

1. An absorption-desorption method for the separation of water soluble organic compounds from the aqueous solution containing the same wherein the water soluble organic compounds are selected from the group consisting of (a) compounds containing active hydrogen atoms wherein said active hydrogen atoms are present in the form of (1) one or more hydroxyl groups substituted to an aromatic ring or an aliphatic hydrocarbon radical or (2) one or more carboxyl groups substituted to an aromatic hydrocarbon radical or an aliphatic hydrocarbon radical; and (b) compounds containing a hydrophobic group consisting of (a) surfactants, (b) proteins, (c) physiologically-active substances or (d) colorants from an aqueous solution which comprises the steps of:
   (a) providing a water insolubilized polymeric adsorbent material selected from the group consisting of:
      (1) a homopolymer of at least one monomer selected from N-alkyl- or N-alkylene- substituted (meth)acrylamides represented by the following general formula (I) or (II):

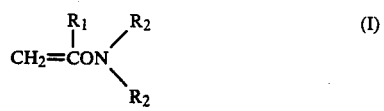

wherein $R_1$ is a hydrogen atom or methyl group and $R_2$ is a methyl or ethyl group, or

wherein $R_1$ is a hydrogen atom or methyl group and A is member selected from the group consisting of $-(CH_2)_n-$ or $-(CH_2)-O-(CH_2)_2-$ wherein n is an integer of from 4 to 6;
  (2) a first copolymer of two or more monomers selected from said (meth)acrylamides, and
  (3) a second copolymer of at least one monomer selected from said (meth)acrylamides and one or more monomers other than said (meth)acrylamides and copolymerizable therewith;
(b) bringing said aqueous solution containing said water soluble organic compounds into contact with said polymeric absorbent material at a first adsorbing temperature for a time sufficient to allow said water soluble organic compounds to be adsorbed from said aqueous solution onto said polymeric adsorbent material;
(c) separating said aqueous solution from said polymeric adsorbent material containing said absorbed water soluble organic compounds; and
(d) desorbing said water soluble organic compounds from said polymeric absorbent material by contacting said polymeric absorbent material with a desorbing aqueous solution at a second desorbing temperature which is lower than the first absorbing temperature.

2. A method according to claim 1 wherein said first absorbing temperature is within the range of 10° to 100° C. and the second desorbing temperature is within the ransge of −10° to 50° C.

3. A method according to claim 2 wherein the polymeric absorbent material is added to said aqueous solution at said first adsorbing temperature under agitation in a container thereby causing said water soluble organic compounds to contact said adsorbent material and be adsorbed thereon; separating said aqueous solution from said adsorbent material having absorbed thereon said water soluble organic compounds from said polymeric absorbent material by bringing together said polymeric absorbent material and said desorbing aqueous solution at said desorbing temperature under agitation.

4. A method according to claim 2 comprising the steps of:
(a) placing said polymeric absorbent material in a fixed bed,
(b) passing said aqueous solution containing said water soluble organic compounds maintained at said first absorbent temperature through said fixed bed whereby said water soluble organic compounds are absorbed onto said polymeric absorbent material; and
(c) passing said desorbing aqueous solution maintained at said second desorbing temperature through said fixed bed thereby desorbing said water soluble organic compounds from said polymeric absorbent material.

5. A method according to claim 2 comprising the steps of:
(a) passing said polymeric absorbent material through said aqueous solution containing said water soluble organic compounds maintained at said first adsorbent temperature whereby said water soluble organic compounds are adsorbed onto said polymeric adsorbent material; and
(b) subsequently passing said polymeric adsorbent material containing adsorbed water soluble organic compounds through said desorbing aqueous solution maintained at said second desorbing temperature thereby desorbing said water soluble organic compounds from said polymeric adsorbent material.

6. A method according to claim 1 wherein the homopolymer is a homopolymer of one of N-alkylene-substituted (meth)acrylamide represented by the general formula (II):

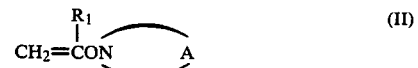

wherein $R_1$ is a hydrogen atom or methyl group and A is a member selected from the group consisting of $-(CH_2)_n-$ or $-(CH_2)-O-(CH_2)_2-$ wherein n is an integer of from 4 to 6;
  (2) a first copolymer of two or more N-alkylene-substituted (meth)acrylamide monomers, and monomer selected from said N-alkylene-substituted
  (3) a second copolymer of at least one after (meth)acrylamides and one or more monomers other than said N-alkylene-substituted (meth)acrylamides and copolymerizable therewith.

7. A method according to claim 6 wherein the copolymer is N-acryloyl-pyrolidone and N-acryloyl piperidine.

8. A method according to claim 1 wherein the water soluble organic compound contains one or more hyroxyl groups substituted to an aromatic ring.

9. A method according to claim 8 wherein the water soluble organic compound is a member selected from the group consisting of phenol, cresol, xylenol, hydroquinone, benzenetriol, salicyl alcohol, naphthol, anthrol, nonylphenol, carvacrol, vinylphenol, isopropenylphenol, dipheneylphenol, biphenyldiol, naphthylphenol, phenylnaphthol, p-cumylphenol and 4,4′-dihydroxydiphenylsulfon.

10. A method according to claim 1 wherein the water soluble organic compound contains one or more hydroxyl groups substituted to an aliphatic hydrocarbon radical.

11. A method according to claim 10 wherein the water soluble organic compound is a saturated aliphatic alcohol.

12. A method according to claim 1 wherein the water soluble organic compound is a surfactant.

13. A method according to claim 12 wherein the surfactant is a member selected from the group consisting of anionic, nonionic, cationic and amphoteric surfactants.

14. A method according to claim 1 wherein the water soluble organic compound is a protein.

15. A method according to claim 14 wherein the protein has a molecular weight in the range of from 1,000 to 1,000,000.

16. A method according to claim 1 wherein the water soluble organic compound is a physiologically-active substance.

17. A method according to claim 16 wherein the physiologically-active substance is a member selected from the group consisting of antibiotics, hypnosedatives, antiepileptics, antipyretics, analgesics, antiphlogistics, mental and nervous drugs, obtunents, muscle relaxants, autonomic drugs, sense organ drugs, antihistamines, cardiotonics, antiarrhythmics, hypotensor and diuretic drugs, vasodilators, therapeutic drugs for arteriosclerosis, anhelation drugs, antibechic and expectorant drugs, digestive organ drugs, adrenal hormone preparations, sex hormone and other hormone preparations, bacteriocidal and disinfectant agents, vitamin preparations, nourishing, antathenic and alterative agents, anticoagulants, stiptics, liver drugs, therapeutic drugs for intoxication, enzyme preparations, antidiabetics, antimaligant tumor drugs, chemotherapeutic drugs, biological preparations, anthelmintics, antiprotozoals and narcotics.

18. A method according to claim 17 wherein the physiologically-active substance is an antibiotic.

19. A method according to claim 1 wherein the water soluble organic compound is a colorant.

20. A method according to claim 19 wherein the colorant is a member selected from the group consisting of dyes, organic pigments, coloring agents and titration indicators.

* * * * *